C. PARSONS.
HOSE COUPLING.
APPLICATION FILED JUNE 1, 1912.
1,039,584.
Patented Sept. 24, 1912.
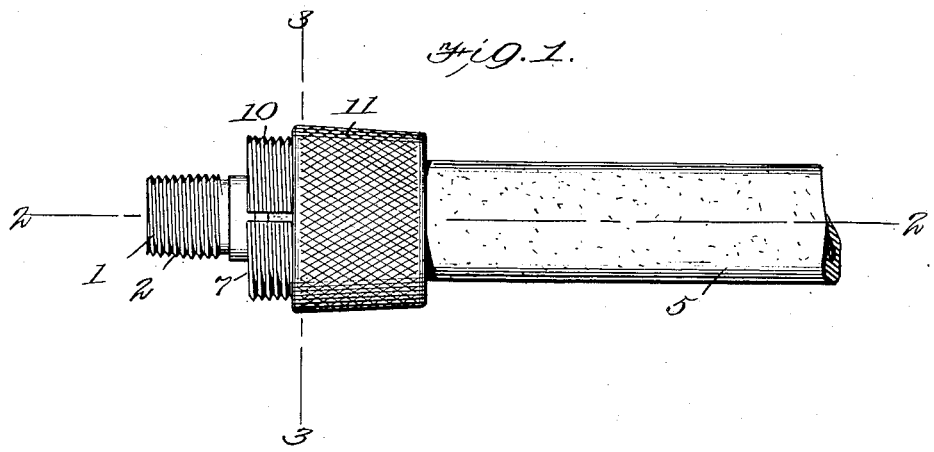
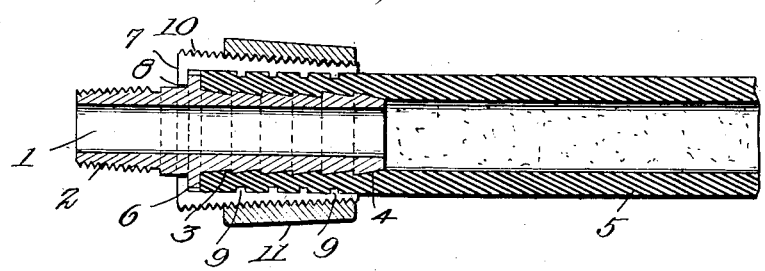
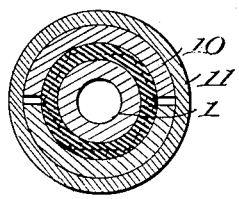
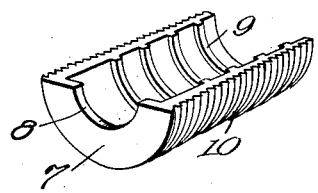
WITNESSES
F. C. Barry
C. E. Trainor
INVENTOR
Charles Parsons
BY Munn & Co.
ATTORNEYS

UNITED STATES PATENT OFFICE.

CHARLES PARSONS, OF CLEVELAND, OHIO.

HOSE-COUPLING.

1,039,584.  Specification of Letters Patent.  Patented Sept. 24, 1912.

Application filed June 1, 1912. Serial No. 700,925.

*To all whom it may concern:*

Be it known that I, CHARLES PARSONS, a citizen of the United States, and a resident of Cleveland, in the county of Cuyahoga and State of Ohio, have invented a new and useful Improvement in Hose-Couplings, of which the following is a specification.

My invention is an improvement in hose coupling, and has for its object, the provision of a coupling of the character specified, especially adapted for connecting the supply pipe to the tube in such machines as riveting hammers, drills, reamers, clippers and other machines utilizing compressed air as a motive fluid wherein means is provided for making a connection without the necessity of tools and without requiring skilled labor, and which will obviate the danger of blow-out and the like.

In the drawing:—Figure 1 is a plan view of the coupling; Figs. 2 and 3 are sections on the lines 2—2 and 3—3 respectively of Fig. 1; and Fig. 4 is a perspective view of one of the sections of the coupling.

In the present embodiment of the invention, the nipple 1 is provided with the externally threaded end 2 for engaging the opening in the tool, and the opposite end of the said nipple is provided with a series of annular spaced shoulders 3, facing toward the threaded end of the tool, the inner edge of each shoulder being connected to the outer edge of the next shoulder by the inclined or conical surface 4. The said end of the nipple is adapted to be inserted in the end of the flexible pipe or hose 5, and an annular rib 6 is provided between the threaded portion and the shouldered portion of the nipple for engagement by the end of the hose to limit the inward movement of the nipple in the hose. A clamping device is provided comprising a plurality of jaws or sections, each section or jaw 7 of the clamping device having an internal flange 8, coöperating with the flange of the adjacent section to form an annular stop, for engaging the opposite face of the rib 6 from the end of the hose. The sections are fitted over the outer surface of the hose at the nipple with the flanges 8 engaging the rib 6. Each of the said sections is provided with a plurality of transverse internal ribs 9, the ribs of one section being in alinement with the ribs of the other section, and the said ribs are adapted to be forced into the outer surface of the hose, as shown in Fig. 2.

The sections are so shaped externally that when the clamping device is in place on the hose, the outer surface of said device is frusto-conical, and the said surface is threaded, as shown at 10 in Figs. 1 to 3. A sleeve 11 of frusto-conical shape is threaded onto the sections for clamping them together on the hose. The said sleeve is engaged with the sections at the small end, and it will be obvious that when the sleeve is turned in the proper direction, the sections will be forced together on the hose. The end of the hose is thus clamped between the outer surface of the shouldered portion of the nipple and the inner ribbed surface of the clamping jaws, and as the shoulders and the ribs bite into the surface of the hose, there can be no possibility of separation between the parts. The device may be applied without the necessity of any tool, and the clamping jaws may be clamped on the hose merely by turning the sleeve with the hand.

The device is simple but very efficient, and makes a fluid-tight connection. The nipple 1 is of the ordinary form, and the connection between the nipple and the hose is ordinarily made with a wire wrapped around the hose holding the same to the shouldered surface of the nipple. The sections 7 are so arranged that there is sufficient room between their adjacent edges to insure a good clamping action.

I claim:—

1. A coupling of the character specified, comprising in combination with the hose and the nipple having one end threaded and the other provided with annular shoulders spaced apart from each other and facing the threaded end, said nipple having an external annular rib between the threaded surface and the shouldered surface for engagement by the end of the hose, of a clamping device comprising clamping jaws, each being semi-circular in cross section and having at one end an internal rib for engaging the opposite face of the rib of the nipple from the hose, said sections being frusto-conical externally, the large end being at the rib, said sections being threaded externally, and each having a plurality of transverse ribs on its inner face, and a frusto-conical internally threaded sleeve for engaging the sections to clamp them together on the hose.

2. A coupling of the character specified, comprising in combination with the hose and the nipple having one end threaded and the other provided with annular shoulders spaced apart from each other and facing the threaded end, said nipple having an external annular rib between the threaded surface and the shouldered surface for engagement by the end of the hose, of a clamping device comprising clamping jaws, each being semi-circular in cross section and having at one end an internal rib for engaging the opposite face of the rib of the nipple from the hose, said sections being frusto-conical externally, the large end being at the rib, said sections being externally threaded and each having an internal roughened surface for engaging the hose, and a frusto-conical internally threaded sleeve for clamping the sections together on the hose.

3. A coupling of the character specified, comprising in combination with the hose, and the nipple having one end externally roughened, and having a stop at the inner end of the roughened surface for engagement by the end of the hose, of a clamping device comprising clamping jaws, each semi-circular in cross section, the said jaws being frusto-conical externally, and each jaw having at the large end a stop for engaging the opposite face of the stop on the nipple from the hose, said sections being externally threaded and each having its internal surface roughened, and a frusto-conical internally threaded sleeve for engaging the sections to clamp them together on the hose.

4. A coupling of the character specified, comprising in combination with the hose, and the nipple having one end externally roughened, and having a stop at the inner end of the roughened surface for engagement by the end of the hose, of a clamping device for engagement by the end of the hose, said clamping device comprising clamping jaws each semi-circular in cross section, the said jaws being frusto-conical externally, and each jaw having at the large end a stop for engaging the opposite face of the stop on the nipple from the hose, and a frusto-conical sleeve movable longitudinally of the sections for clamping them on the hose.

CHARLES PARSONS.

Witnesses:
GLENN C. WATKINS,
WM. H. CHAPMAN.